US010246136B2

(12) United States Patent
Scholz et al.

(10) Patent No.: US 10,246,136 B2
(45) Date of Patent: Apr. 2, 2019

(54) UNDERBODY CLADDING FOR A TWO-TRACK MOTOR VEHICLE AND TWO-TRACK MOTOR VEHICLE WITH SUCH AN UNDERBODY CLADDING

(71) Applicant: Bayerische Motoren Werke Aktiengesellschaft, Munich (DE)

(72) Inventors: Hubert Scholz, Munich (DE); Roland Schmidt, Stockdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 120 days.

(21) Appl. No.: 15/172,503

(22) Filed: Jun. 3, 2016

(65) Prior Publication Data
US 2016/0280284 A1    Sep. 29, 2016

Related U.S. Application Data

(63) Continuation of application No. PCT/EP2014/073610, filed on Nov. 3, 2014.

(30) Foreign Application Priority Data

Dec. 6, 2013  (DE) .......... 10 2013 225 083

(51) Int. Cl.
*B62D 29/00* (2006.01)
*B62D 29/04* (2006.01)
(Continued)

(52) U.S. Cl.
CPC ............. *B62D 29/041* (2013.01); *B60G 3/20* (2013.01); *B60G 7/001* (2013.01);
(Continued)

(58) Field of Classification Search
CPC ...... B62D 35/16; B62D 35/12; B62D 25/168; B62D 29/041
See application file for complete search history.

(56) References Cited

U.S. PATENT DOCUMENTS

2011/0163570 A1   7/2011  Takeuchi
2011/0309652 A1  12/2011  Eichentopf et al.

FOREIGN PATENT DOCUMENTS

CN      1550399 A    12/2004
CN    102143878 A     8/2011
(Continued)

OTHER PUBLICATIONS

Chinese-language Office Action issued in counterpart Chinese Application No. 201480066254.1 dated Apr. 14, 2017 with English translation (fourteen (14) pages).
(Continued)

*Primary Examiner* — Hau V Phan
(74) *Attorney, Agent, or Firm* — Crowell & Moring LLP

(57) ABSTRACT

An underbody cladding is provided for a two-track motor vehicle with wheel-controlling links as part of a rear axle for cladding the underbody. The underbody cladding at least partially extends in a substantially horizontal plane and extends in the direction of the outside of the vehicle close to an inner side of a rear wheel. The underbody cladding is divided into three sections, a front section, a central section and a rear section. The central section extends at least over a region below the wheel-controlling links and is connected at least over part of the width thereof to the front section and/or the rear section. The central section is designed in such a manner that the section can at least partially follow and/or yield to a vertical movement of the wheel-controlling links. The front and the rear section of the underbody cladding can in each case be arranged in a positionally fixed manner on the motor vehicle and cannot follow and/or yield to a vertical movement of the wheel-controlling links.

16 Claims, 9 Drawing Sheets

(51) Int. Cl.
    *B62D 35/02*     (2006.01)
    *B60R 13/08*     (2006.01)
    *B60G 3/20*     (2006.01)
    *B60G 7/00*     (2006.01)
    *B62D 25/20*     (2006.01)

(52) U.S. Cl.
    CPC ...... *B60R 13/0861* (2013.01); *B62D 25/2018* (2013.01); *B62D 25/2027* (2013.01); *B62D 35/02* (2013.01); *B60G 2204/4308* (2013.01); *B60G 2206/10* (2013.01); *B60G 2206/8207* (2013.01); *Y02T 10/88* (2013.01)

(56) References Cited

FOREIGN PATENT DOCUMENTS

| DE | 31 10 991 | A1 | 5/1982 |
| DE | 32 39 946 | A1 | 5/1984 |
| DE | 102 09 591 | A1 | 9/2003 |
| DE | 10 2010 004 532 | A1 | 8/2010 |
| EP | 0 888 956 | B1 | 8/2002 |
| FR | 2 896 224 | A1 | 7/2007 |
| FR | 2 961 468 | A1 | 12/2011 |
| WO | WO 2007/083055 | A1 | 7/2007 |
| WO | WO 2010/136460 | A1 | 12/2010 |

OTHER PUBLICATIONS

German-language Search Report issued in counterpart German Application No. 10 2013 225 083.5 dated Apr. 10, 2017 with partial English translation (11 pages).

International Search Report (PCT/ISA/210) issued in PCT Application No. PCT/EP2014/073610 dated Jan. 28, 2015 with English translation (seven pages).

German-language Written Opinion (PCT/ISA/237) issued in PCT Application No. PCT/EP2014/073610 dated Jan. 28, 2015 (seven pages).

UNDERBODY CLADDING FOR A TWO-TRACK MOTOR VEHICLE AND TWO-TRACK MOTOR VEHICLE WITH SUCH AN UNDERBODY CLADDING

CROSS REFERENCE TO RELATED APPLICATIONS

This application is a continuation of PCT International Application No. PCT/EP2014/073610, filed Nov. 3, 2014, which claims priority under 35 U.S.C. § 119 from German Patent Application No. 10 2013 225 083.5, filed Dec. 6, 2013, the entire disclosures of which are herein expressly incorporated by reference.

BACKGROUND AND SUMMARY OF THE INVENTION

The invention relates to an underbody cladding for a two-track motor vehicle having wheel-controlling links as part of a rear axle, in particular for a passenger motor vehicle, for cladding the underbody at least on one vehicle side in the region of the wheel-controlling links of the rear axle. The invention also relates to a two-track motor vehicle having such an underbody cladding, wherein the underbody cladding is designed such that, in a functional state in which it is installed on a two-track motor vehicle, it extends under the wheel-controlling links at least partially in a substantially horizontal plane, and, at least in the direction of an outer side of the vehicle, extends to close to an inner side of a rear wheel, which is connected by way of a wheel support to the wheel-controlling links, of the motor vehicle.

Generic underbody claddings of this type for two-track motor vehicles are generally known from the prior art, for example from EP 0 888 956 B1, DE 31 10 991 A, WO 2010/136460 A1, DE 10 2010 004 532 A1, DE 32 39 946 A1 and DE 102 09 591 A1. With the underbody claddings disclosed in the cited documents, it is possible, in a functional state in which the underbody claddings are installed on a two-track motor vehicle, for only a region of the underbody directly under the wheel suspension on an inner side of a wheel arch to be covered, but not adjoining regions, such that, for further coverage, it is generally the case that additional underbody cladding parts are required. This often yields aerodynamic disadvantages and, in particular, can lead to an undesired increase of the drag coefficient ($c_x$). Alternatively, however, the described underbody claddings have relatively large-area sections of elastic form, which however tend to flutter owing to their flexible material which is required for preventing a collision with the moving wheel-controlling links.

It is therefore an object of the present invention to provide an improved, large-area underbody cladding which, in particular, exhibits a reduced tendency to flutter and extends over a larger region than just the region below the wheel-controlling links of a two-track motor vehicle.

This and other objects are achieved by way of an underbody cladding, as well as by way of a two-track motor vehicle having such an underbody cladding, in accordance with embodiments of the invention.

An underbody cladding according to the invention is characterized in that the underbody cladding is divided in the vehicle longitudinal direction into three sections, specifically into a front section, a central section and a rear section. The central section extends, at least over one region, under the wheel-controlling links on one vehicle side, and is connected at least over a part of its with to the front section and/or to the rear section. The central section is designed such that, in a functional state in which it is installed on a motor vehicle, during driving operation of the motor vehicle, the central section can at least partially follow and/or yield to a substantially vertical movement of the wheel-controlling links, wherein the front section and the rear section of the underbody cladding are designed such that they can be arranged in positionally static fashion on the motor vehicle and, in a functional state in which they are installed on the motor vehicle, cannot follow and/or yield to a substantially vertical movement of the wheel-controlling links.

A two-track motor vehicle according to the invention is characterized in that it has an underbody cladding according to the invention.

By way of an underbody cladding according to the invention, it can be achieved that, in particular during forward travel, air flow passes not directly around but passes under the wheel-controlling links of the rear axle, in particular the lower links, on the vehicle side on which the underbody cladding is arranged in a functional, installed state. That is to say, by way of the underbody cladding according to the invention under the wheel-controlling links of the rear axle, the approaching air flow can be guided past the lower wheel-controlling links in the direction of the vehicle rear end. In this way, it is possible to prevent air flow from passing in the vehicle longitudinal direction through a structural space in which the wheel-controlling links are arranged, which has a highly advantageous effect in terms of the aerodynamics and which can in particular lead to a reduced drag coefficient ($c_x$).

The division, according to the invention, of the underbody cladding into three sections, of which the central section can yield to or deflect as a result of the movement of the wheel-controlling links and the front section and the rear section can in each case be fastened in positionally static fashion to the vehicle, makes it possible to provide an improved, large-area underbody cladding which extends over a larger region than just the region under the wheel-controlling links, and which has a reduced tendency to flutter.

Here, the positionally static arrangement relates to the attachment points of the front section and of the rear section of the underbody cladding, that is to say only these are attached in positionally static fashion or fixed in positionally static fashion, and a movement of the other regions of the front and of the rear section owing to an intrinsic movement is not thereby ruled out. In particular, the positionally static arrangement of the front section and of the rear section does not rule out a displacement or movement of parts of the front and/or of the rear section owing to the material characteristics, for example owing to an elastic material.

Here, the underbody cladding is preferably a sheetlike structure which is designed for cladding the underbody on one vehicle side or on one side of the rear axle, that is to say for cladding the wheel-controlling links of the rear axle on the right-hand side of the vehicle from below or for cladding the wheel-controlling links of the rear axle on the left-hand side of the vehicle from below. The underbody cladding is particularly preferably designed to be arranged directly under the lower wheel-controlling link or under a lower link plane which may be formed, for example, by a spring link and by a longitudinal link.

The underbody cladding may, however, also be of large-area design such that it is designed for cladding the underbody in the entire region of the rear axle, that is to say for cladding the underbody both in the region of the wheel-controlling links of the right-hand part of the rear axle and in the region of the wheel-controlling links of the left-hand part of the rear axle.

Here, the underbody cladding preferably extends, with an edge facing toward the outside of the vehicle, to as close as possible to a wheel arch, wherein the underbody cladding preferably not only extends in the direction of the outside of the vehicle to close to the inner side of the rear wheel that is connected by way of the wheel support to the wheel-controlling links, but particularly preferably also extends to close to the wheel arch in the region in front of and/or behind the rear wheel. That is to say, the underbody cladding particularly preferably extends in U-shaped or C-shaped fashion around the wheel arch, in particular at least partially in the substantially horizontal plane.

The underbody cladding is preferably designed in such a way, or extends only to so close to the wheel arch, that it can also be used in two-track motor vehicles with a rear-axle steering system, in particular in the case of motor vehicles with wheel steer angles of the rear wheels of in each case less than 5°.

In a preferred embodiment, the underbody cladding is of unipartite form, wherein the expression "unipartite" means "in one piece". That is to say, in a particularly preferred development, the underbody cladding is not a sheetlike structure assembled from multiple individual sheetlike structures, but is a single, coherent sheetlike structure and is preferably manufactured from one piece. The unipartite form permits particularly simple assembly and inexpensive production.

In one development of the invention, the underbody cladding is divided, in such a way that the central section can at least partially follow and/or yield to a vertical movement of the wheel-controlling links, by way of at least two slots which extend toward the inside of the vehicle from an outer edge which, in a functional installed state, faces toward the inner side of the rear wheel. That is to say, it is preferably the case that a unipartite underbody cladding has at least two slots which, in each case, divide the central section from the front section and from the rear section respectively at least over a part of the width of the underbody cladding, such that the central section can, in the region of the slots or over the length of the slots, be moved in flexible fashion independently of the adjacent front section and of the adjacent rear section, in particular in such a way that adequate flexibility or yieldingness of the central section is realized, and the central section can follow a movement of the wheel-controlling links, or can be moved in yielding fashion.

The slots in this case preferably extend obliquely toward the inside of the vehicle from the rear wheel-side outer edge of the underbody cladding, wherein the slots are preferably of trapezoidal form and, in particular, form the two side edges of a trapezium. Here, it is particularly preferable for a spacing between those slot ends which are situated further toward the inside to be greater toward the center of the vehicle than the spacing between the slot ends in the region of the outer edge, that is to say the spacing of the slot ends becomes smaller toward the outside of the vehicle.

Alternatively, the slots may also be arranged so as to form the side edges of a rectangle, of a parallelogram or the like or so as to extend relative to one another in any desired manner. The underbody cladding may also have just one slot or may have more than two slots, wherein the slots may be of equal length, or else may be of different lengths. It is important merely that the slot or slots are arranged such that the central section exhibits such flexibility or yieldingness so that movement of the wheel-controlling links is not impeded or movement of the wheel-controlling links does not lead to collision or damage, in particular to the underbody cladding and/or to the wheel-controlling links.

If the underbody cladding has two slots, as described above, these preferably extend over at least two thirds of the width of the underbody cladding in the vehicle transverse direction. The slots particularly preferably have at least a length of at least one of the wheel-controlling links, wherein the two slots preferably have the same length. In some cases, it may however even be adequate for the slots to have only a length of approximately two thirds of the length of one of the wheel-controlling links.

In a particularly preferred development, in the case of two slots arranged in trapezoidal fashion, the slots are connected to one another, between their ends nearest the inside of the vehicle, by way of a film hinge, preferably by way of a film hinge running substantially in the vehicle longitudinal direction, i.e. having a hinge axis running substantially in the vehicle longitudinal direction, in a functional state in which the underbody cladding is installed on a motor vehicle.

In the context of this application, a film hinge is a hinge which is formed by a fold or the like along the hinge axis and which is formed integrally with the two elements to be connected. The film hinge, owing to its flexibility, permits a limited rotational or folding movement of the connected parts about the hinge axis.

Owing to the arrangement of a film hinge between those slot ends which are nearest the inside of the vehicle, it is possible for a type of bend line or a fold to be realized in the central section. This has the effect that that part of the central section which is nearest the outside of the vehicle can move up and down more easily between the slots, and can thus follow or yield to the movement of the wheel-controlling links more easily, in particular with less resistance. In this way, it is possible to achieve greater flexibility or greater yieldingness of the central section.

The arrangement of an additional film hinge is particularly advantageous if the flexibility or the elasticity of the material of the underbody cladding together with the slots is not sufficient to realize adequate yieldingness or an adequate resilient action of the central section in order to be able to follow or yield to a movement of the wheel-controlling links.

In an alternative embodiment, the underbody cladding is not a single-part but has a multi-part form, wherein the central section is in this case connected preferably to the front section and/or to the rear section over at least a part of the width of the underbody cladding, in particular by way of a film hinge. That is to say, in an alternative embodiment, the underbody cladding is assembled from multiple individual sheetlike structures, and preferably has a connection between the central section and the front section and/or between the central section and the rear section, which connection extends at least over a part of the width of the underbody cladding.

In a particularly preferred development, the central section is in this case connected in each case over its entire width of the underbody cladding to the front section and/or to the rear section. In this way, it is possible to realize a large-area underbody cladding by way of which flow losses in the transition regions between the central section and the adjacent sections can be substantially eliminated.

Owing to the embodiment of the connection between the central section and the front and/or the rear section as a film hinge, it is possible in a particularly simple and inexpensive manner for the central section to follow the movement of the wheel-controlling links, whereas the front and rear sections can be arranged on or fastened to the vehicle in positionally static fashion relative to the underbody, such that the front and rear sections do not need to follow or yield to the movement of the wheel-controlling links.

In a preferred development, at least one connection axis, that is to say an axis along which the central section is connected to the front section and/or to the rear section, extends through a kinematic point, projected vertically downward into the substantially horizontal plane of the underbody cladding, of at least one attachment of one of the wheel-controlling lower links to the wheel support. Here, the connecting axis runs preferably through an effective kinematic point, projected into the substantially horizontal plane, of the attachment point of a spring link and/or of a longitudinal link, in particular of the longitudinal link, to the wheel support.

If the central section is connected both to the front section and to the rear section, it is particularly preferably the case that the two connecting axes, that is to say the axis of the connection between the front and the central section and the axis of the connection between the central and the rear section, intersect in the plane of the underbody cladding in an elongation of a longitudinal axis, projected vertically downward into said plane, of one of the wheel-controlling links, in particular of the spring link. Here, the intersection point preferably lies further toward the inside, that is to say further toward the center of the vehicle, than the effective kinematic point of the attachment of the link to the vehicle body.

By way of a suitable arrangement of the connection axes, preferably by way of a suitable angular orientation of the connecting axes with respect to one another, in particular by way of the arrangement described above, it is possible, in the case of a movement of the wheel-controlling lower links, to prevent a collision with the underbody cladding, in particular with the central section, and to prevent damage to the individual components.

In a preferred embodiment, the front section and the rear section are composed of a flexible, in particular flexurally soft, material, whereas the central section at least partially has a region composed of elastic material, preferably an elastic foil, in particular a resiliently elastic foil or the like, that is to say a material that can be elastically deformed even by low forces.

In an alternative refinement, it is also possible for the front section and the rear section to have an elastic material, and for the central section to have a flexible material, wherein, in this case, too, the front section and the rear section are in each case designed such that they can be arranged in positionally static fashion on the motor vehicle.

The materials for the individual sections are in this case preferably selected or coordinated with one another such that the central section can follow or yield to or deflect as a result of the movement of the wheel-controlling links, without the wheel-controlling links colliding with the underbody cladding or individual components being damaged, and preferably without the connection between the central section and the front section and/or the rear section being damaged.

In one advantageous development, the central section is in turn divided in the vehicle longitudinal direction into at least two subsections, specifically into at least a front subsection and a central subsection, wherein the central subsection extends, at least over a region, under one of the wheel-controlling links, and preferably extends, over the region, under the link which, during functional use, performs the greatest vertical movement. The central subsection is particularly preferably connected at least over a part of its width to the front subsection. That is to say, in a preferred embodiment, the underbody cladding is divided into at least four sections overall: a front section, a front subsection, a central subsection and a rear section, wherein the two subsections form the central section, and wherein the central subsection is particularly preferably at least partially connected to the front subsection.

In a particularly preferred development, the central section is however divided in the vehicle longitudinal direction into at least three subsections, specifically into at least a front subsection, a central subsection and a rear subsection, wherein the central subsection likewise extends, at least over a region, under one of wheel-controlling links, and preferably extends, over the region, under the link which performs the greatest vertical movement during functional use. The central subsection is preferably connected at least over a part of its width to the front subsection and/or to the rear subsection. That is to say, in a particularly preferred embodiment, the underbody cladding is divided into at least five sections overall: a front section, a front subsection, a central subsection, a rear subsection and a rear section, wherein, in this case, the three subsections form the central section, and the central subsection is preferably connected to the front subsection and/or to the rear subsection.

If the subsections are not connected to one another, it is advantageous, in particular with regard to the aerodynamic characteristics of the underbody cladding, for the subsections to extend as close as possible to one another, that is to say, when the subsections are in a functional state in which they are installed on a motor vehicle, for only a narrow, that is to say extremely small, gap to be provided between them, through which as far as possible no air flow can pass from an underside of the underbody cladding through to a top side of the underbody cladding.

It is preferable for only the central subsection to have, or be composed of, elastic material, whereas the front subsection and the rear subsection are composed of flexible material, in particular from the same flexible material as the front section and the rear section. It is particularly preferable in each case for the front subsection to be connected integrally to the front section and for the rear subsection to be connected to the rear section by way of a film hinge.

The central subsection is preferably composed of elastic material and connected preferably to the front subsection and/or to the rear subsection, that is to say to the immediately adjoining subsections, by way of a welt connection.

Below, a welt connection is to be understood to mean a connection which is formed by way of the positively locking engagement of a welt into a welt rail, wherein here, a welt refers to an edge thickening of a flexible or elastic sheetlike structure. The welt can be inserted into the welt rail such that, perpendicular to the welt rail axis, a positively locking connection is formed between welt rail and welt, such that the sheetlike structure can be areally tensioned transversely with respect to the welt rail. Welt connections are generally known per se from the prior art, for example for the fastening of an awning to a caravan.

An underbody cladding in the case of which the front subsection and the central subsection are connected to one another by way of a welt connection over the entire width of the underbody cladding, but the rear subsection is separated from the central subsection merely by way of a gap, in particular an extremely narrow gap, with regard to a rest position of the wheel-controlling links, has proven to be advantageous in particular with regard to costs. That is to say, an underbody cladding in the case of which the central subsection is connected only to the front subsection, but not to the rear subsection, but rather is separated therefrom by a gap, is particularly advantageous with regard to costs.

To prevent fluttering, the underbody cladding is, in a functional state in which it is installed on a motor vehicle, preferably fastened at least by way of one section, preferably by way of the central section, in particular by way of the central subsection, at least regionally to one of the wheel-controlling links. Said section is in this case particularly preferably attached to the link which, during functional use of the motor vehicle, can assume an absolutely lowest position in a vertical direction, in particular to the spring link.

For the fastening of elastic sections, or of sections which are not inherently sufficiently stiff, it is possible for so-called inlays to be inserted as fastening device into the underbody cladding, which inlays permit fixing or attachment of the respective section to the wheel-controlling links.

In regions in which the underbody cladding is inherently sufficiently stiff, the fastening is preferably realized by way of at least one Cardan bearing, which permits relative movements in all directions and simultaneously permits angular compensation. A particular advantage of Cardan bearings is that the stiffness thereof is generally substantially adjustable according to load direction.

The underbody cladding is particularly preferably designed in such a way, and/or can be fastened to the motor vehicle in such a way, that, in particular, during spring compression movements of the rear wheel, the central section remains in its previous position and, during spring extension movements of the rear wheel, the central section can follow the movement of the wheel-controlling links. For this purpose, it is preferably the case that the central section can, during spring compression movements, be decoupled from the wheel-controlling links, in particular by way of a correspondingly designed connection between the central section and the wheel-controlling links. This permits, in particular in the case of high load states of the motor vehicle, optimum functionality of an underbody cladding according to the invention, in particular with regard to aerodynamics.

The fastening of the underbody cladding elsewhere, that is to say the fastening to the motor vehicle elsewhere, is preferably realized in a conventional manner such as is known from the prior art, for example by way of clips, metal clamps, screws or the like.

In a preferred embodiment, the underbody cladding has at least one flow lip, preferably in the central section, in particular parallel to the inner side of the rear wheel, that is to say in the vehicle longitudinal direction, on the outer edge of the underbody cladding. Here, the flow lip preferably extends over the entire length of the central section in the vehicle longitudinal direction, that is to say over the entire region of the central section. The flow lip may however also be longer, and may extend into the front section and/or the rear section, or else may run all the way along that outer edge of the underbody cladding which faces toward the rear wheel, or else may be shorter, in accordance with requirements.

The flow lip is preferably a flow lip which extends substantially vertically upward, that is to say from the underbody cladding toward the links, or an upwardly curved flow lip, a flow strip or the like. In some cases, it may however also be advantageous for the flow lip to extend downward, or to extend both upward and downward.

In some cases, it may furthermore be advantageous for a flow lip to be arranged in the transition region between the individual sections, in particular if the sections are not connected to one another but are separated by a gap, in particular between the rear section and the central section. In this ways, it is possible to prevent a part of the air flow from being conducted between the individual sections through to the top side of the underbody cladding.

It is also possible for multiple flow lips to be provided, preferably for flow lips to be provided both along that outer edge of the underbody cladding which faces toward the rear wheel and in the region of the division of the individual sections.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
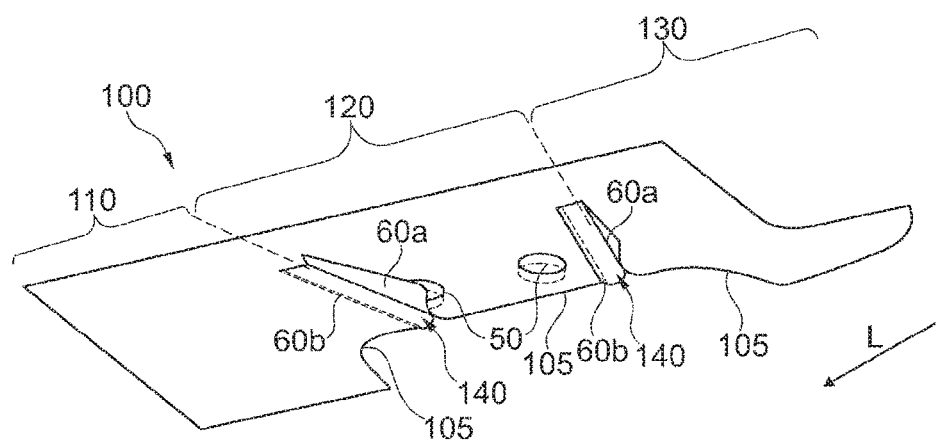
FIG. 1a shows a first exemplary embodiment of an underbody cladding according to the invention illustrated on its own in a perspective view.

FIG. 1a illustrates a first exemplary embodiment of an underbody cladding 100 according to the invention illustrated on its own in a perspective view, wherein the underbody cladding 100 is in the form of a unipartite sheetlike structure composed of a flexible plastics material and has three sections 110, 120 and 130 arranged one behind the other in a vehicle longitudinal direction L, specifically a front section 110, a central section 120 and a rear section 130. Here, the rear section 130 is the section which, in a functional state of the underbody cladding 100 in which the latter is installed on a two-track motor vehicle, points toward the rear end of the motor vehicle, whereas the front section 110 faces toward the front end or is arranged further forward in the vehicle longitudinal direction L, see also FIGS. 1b and 1c. The central section 120 is situated in between.

Figure 1B:
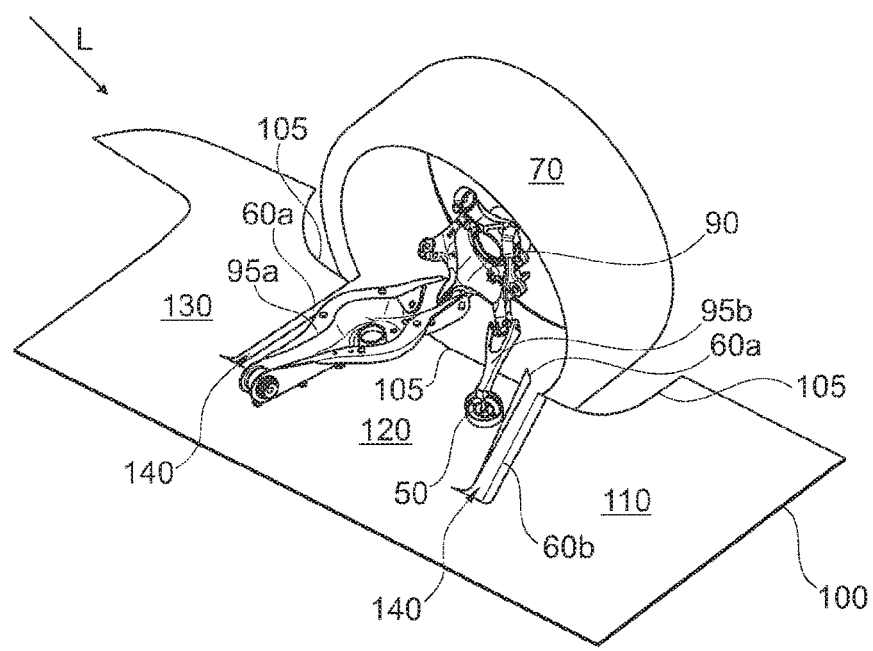
FIG. 1b shows the underbody cladding from FIG. 1a in a functional state in which it is arranged in the region of a rear axle of a two-track motor vehicle, in a view obliquely from above.
Figure 1C:
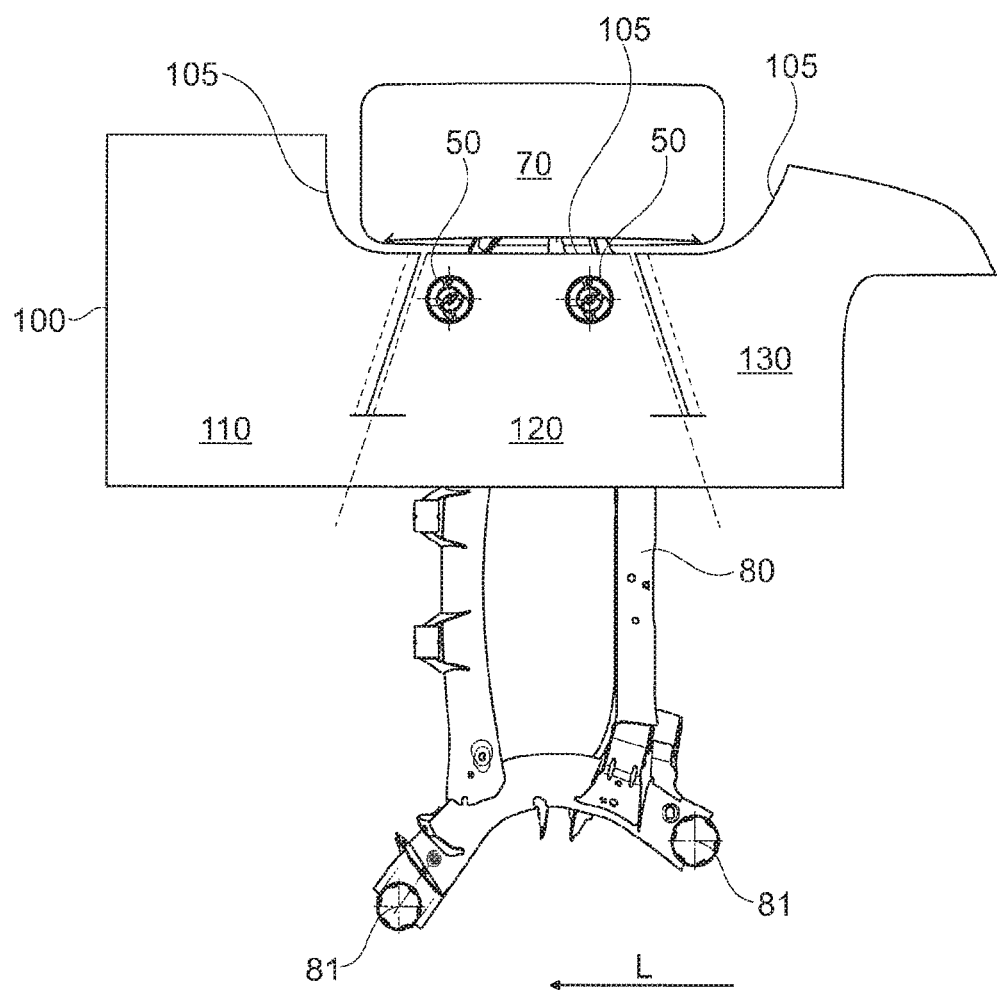
FIG. 1c shows the underbody cladding from FIGS. 1a and 1b in a view from below.

The underbody cladding 100 is in this case designed such that, in a functional state in which it is arranged on a motor vehicle, as illustrated in FIGS. 1b and 1c, the central section 120 is situated under the wheel-controlling links 95a and 95b. In particular, as in this exemplary embodiment, it is situated under a spring link 95a and a longitudinal link 95b, which form a lower link plane and which are connected to a wheel carrier 90.

Figure 1D:
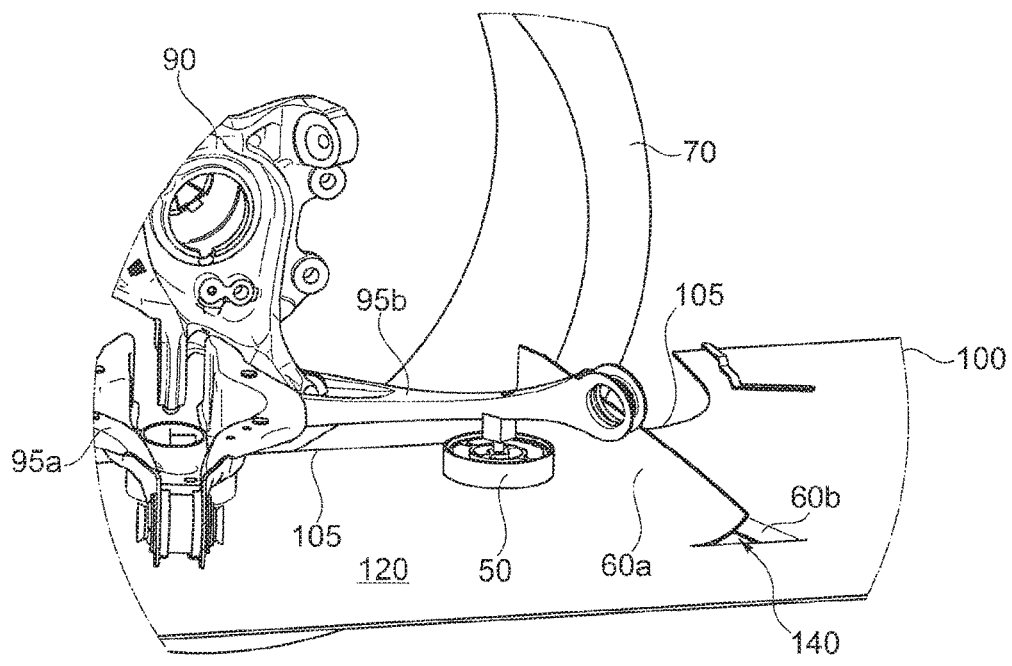
FIG. 1d shows a detail of the underbody cladding from FIGS. 1a to 1c in an enlarged illustration in a side view from the inside of the vehicle.
Figure 1F:
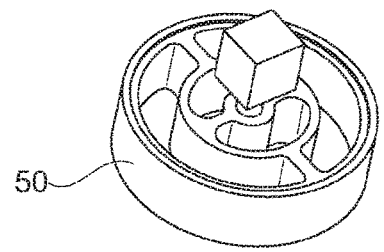
FIG. 1f shows a Cardan bearing for the fastening of the underbody cladding from FIGS. 1a to 1e to a wheel-controlling link.
Figure 1E:
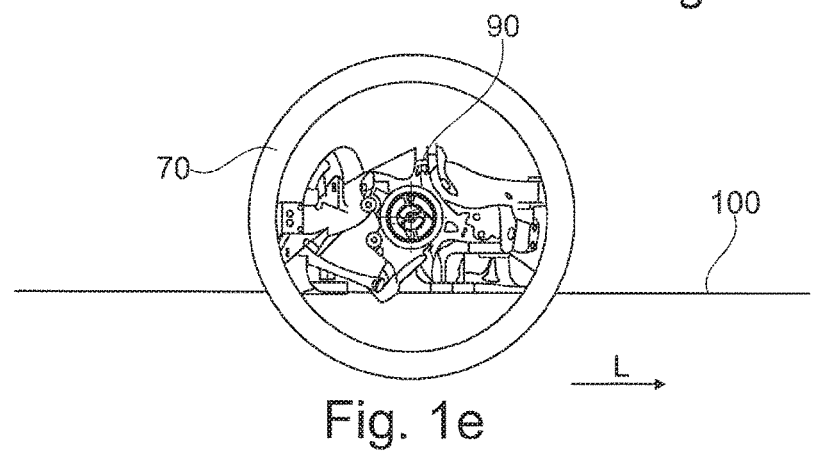
FIG. 1e shows the underbody cladding from FIGS. 1a to 1d in a side view from the outside of the vehicle.

The underbody cladding 100 extends substantially in a horizontal plane, cf. FIG. 1e, and has two obliquely running slots 140 which are arranged in a trapezoidal manner and extend in each case over approximately two thirds of a width of the underbody cladding 100. Here, the slots 140 delimit the central section 120 with respect to the front section 110 and with respect to the rear section 130. Here, the slots 140 have an approximately constant slot width over their length.

In this exemplary embodiment, the slots 140 are arranged so as to form the side edges of a trapezoid or trapezium, wherein the slot ends nearest the outside of the vehicle have a smaller spacing to one another in the vehicle longitudinal direction than the slot ends nearest the inside of the vehicle, that is to say the slots 140 run obliquely forward and inward and obliquely rearward and inward respectively from an outer edge 105 which faces toward a rear wheel 70, see in particular FIG. 1c.

The slots 140, in particular the trapezoidal arrangement thereof, have the effect, together with the flexibility of the plastics material from which the underbody cladding 100 is formed, that the underbody cladding 100 is flexible or yielding in the region of the central section 120, in such a way that the central section 120 can follow a movement of the wheel-controlling links 95a and 95b, in particular a vertical movement, for example during the spring compression and spring extension movements of the rear wheel 70. Here, the slots 140 need not be arranged in a trapezoidal manner, as in the first exemplary embodiment. It is merely important that the slots are arranged such that a desired or required flexibility of the underbody cladding, in particular of the central section 120, is realized.

In order to ensure a targeted, in particular guided, "conjoint movement" of the central section 120 with the wheel-controlling links 95a and 95b, and to also prevent fluttering of the underbody cladding 100, in particular of the central section 120, the underbody cladding 100 in this exemplary embodiment has two Cardan bearings 50 for the fastening of the central section 120 to the wheel-controlling links 95a and 95b. One of the Cardan bearings 50 is provided for fastening to the spring link 95a, and one is provided for fastening to the longitudinal link 95b, see in particular FIGS. 1b, 1c and 1d. Such Cardan bearings 50, which are illustrated by way of example in FIG. 1f, are generally known from the prior art and permit, within certain limits, a relative movement of the parts that are connected by the Cardan bearing 50 and angular compensation, wherein the stiffnesses of the Cardan bearing 50 can generally be set in accordance with requirements.

In this exemplary embodiment, at the slots 140, or in each case at one edge of a slot 140, there is arranged an upwardly bent flow lip 60a and in each case one flow lip 60b or flow edge 60b which extends substantially within the horizontal plane of the underbody cladding 100, see in particular FIGS. 1a and 1d. The flow lips 60a are particularly advantageously arranged in each case at that edge of the slot 140 which is situated further toward the rear in the vehicle longitudinal direction L, wherein a height and width of the flow lip 60a increase in the direction of the outside of the vehicle, in particular increase in the direction of the outside of the vehicle in a manner proportional to the absolute maximum spring travel. The flow lip 60a in this case particularly preferably extends, over its length, upward in each case to such an extent that, during a spring extension movement during forward travel during driving operation, that is to say when the central section is moved downward, no air can flow in the direction of travel to a part, situated behind the central section, of the top side of the underbody cladding 100, which can have a particularly advantageous effect on the air resistance and the drag coefficient ($c_x$).

As can be seen from FIG. 1c, the underbody cladding 100 extends in the vehicle transverse direction toward the inside of the vehicle over approximately half of the width of a rear-axle support 80 which can be fastened by way of rear-axle support bearings 81 approximately centrally under the vehicle, such that the underbody cladding 100, in a functional state in which it is installed on the vehicle, extends toward the inside of the vehicle approximately as far as the center of the vehicle.

In the direction of the outside of the vehicle, the underbody cladding advantageously extends, as in this exemplary embodiment, to close to an inner side of a rear wheel 70, which is fastened to the wheel-controlling links 95a and 95b by way of the wheel support 90 or by way of the wheel bearing fastened to the wheel support, and around the rear wheel to the front and to the rear. As such, an underbody is cladded as completely as possible around a wheel arch and around the rear wheel 70. The cladding preferably is limited only by a structural space required for a free travel of the wheel.

Figure 2A:
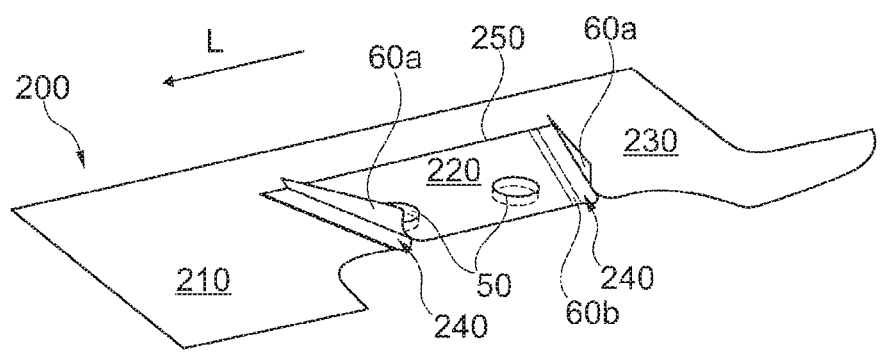
FIG. 2a shows a second exemplary embodiment of an underbody cladding according to the invention illustrated on its own in a perspective view.

FIG. 2a shows a second exemplary embodiment of an underbody cladding 200 according to the invention, wherein said exemplary embodiment is a refinement of the underbody cladding 100 according to the invention from FIGS. 1a to 1e and likewise has a front section 210, a central section 220 and a rear section 230.

In relation to the underbody cladding 100 from FIGS. 1a to 1e, the underbody cladding 200 additionally has a film hinge 250 which, in this case, runs in the vehicle longitudinal direction L between the slot ends nearest the inside of the vehicle. The film hinge serves to increase the flexibility or yieldingness of the central section 220 in a vertical direction and, in particular, permits a type of rotational or folding movement about a hinge axis of the film hinge 250. The film hinge 250 is particularly advantageous if the flexibility of the material of the underbody cladding 200 is in itself not sufficient, together with the slots 140 or 240, to realize sufficient yieldingness in order that the central section 120 or 220 can follow or yield to or deflect as a result of the movement of the wheel-controlling links 95a, 95b.

Figure 3A:
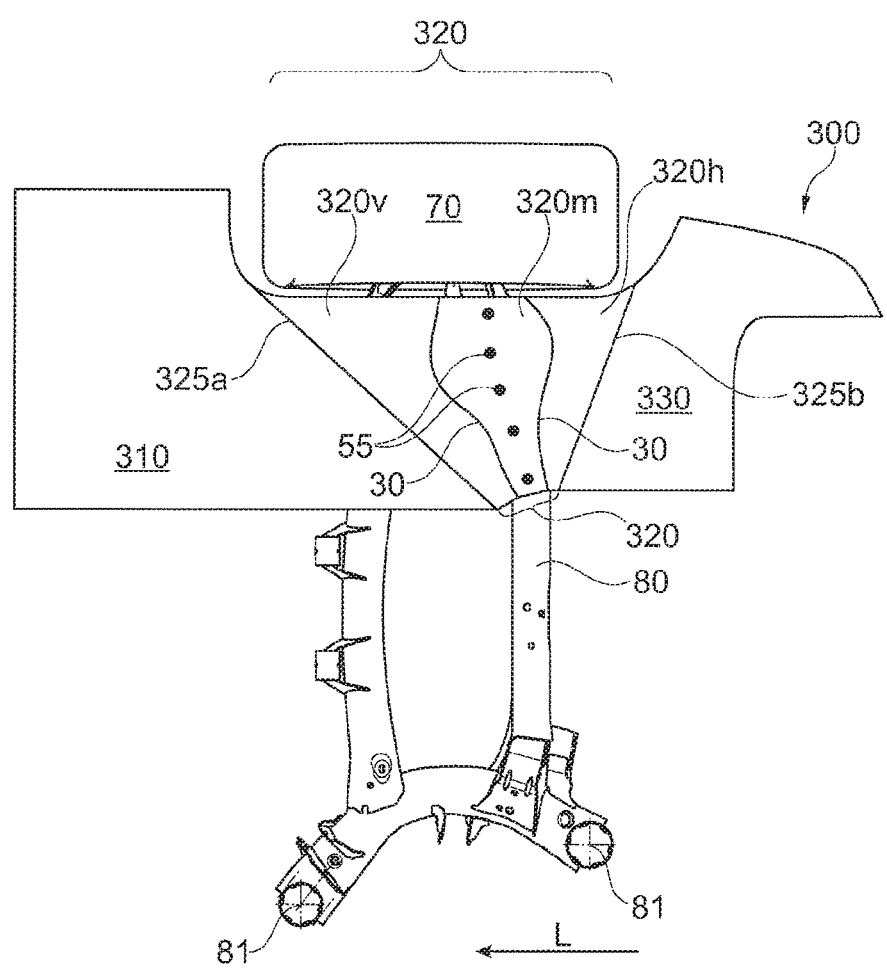
FIG. 3a shows a third exemplary embodiment of an underbody cladding according to the invention in a functional state, in which it is arranged in the region of the rear axle of a two-track motor vehicle, in a view from below.
Figure 3B:
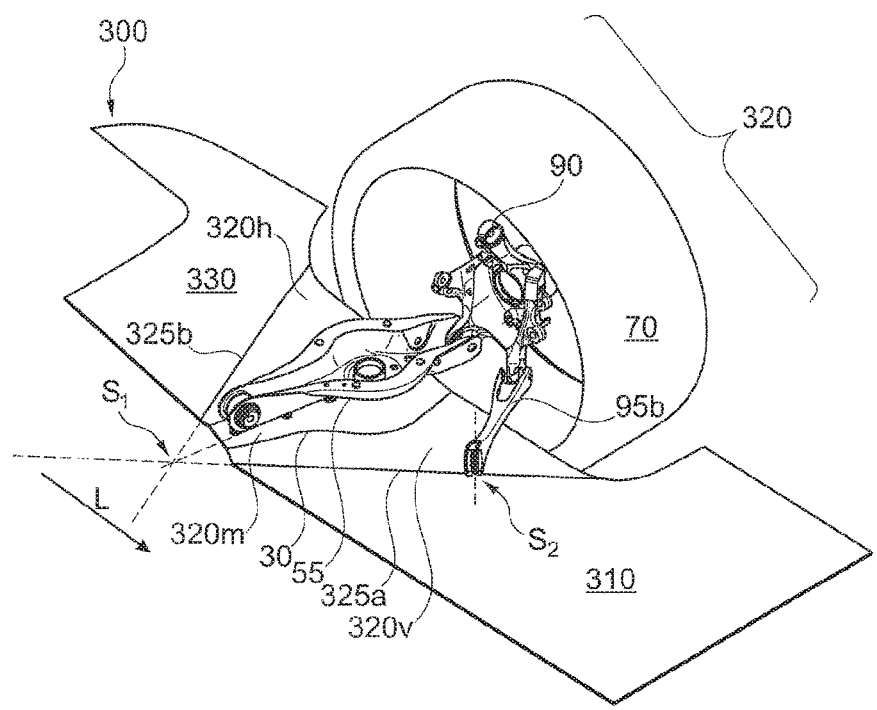
FIGS. 3b and 3c show the underbody cladding from FIG. 3a in a view obliquely from above and in a side view from the outside of the vehicle, respectively.
Figure 3C:
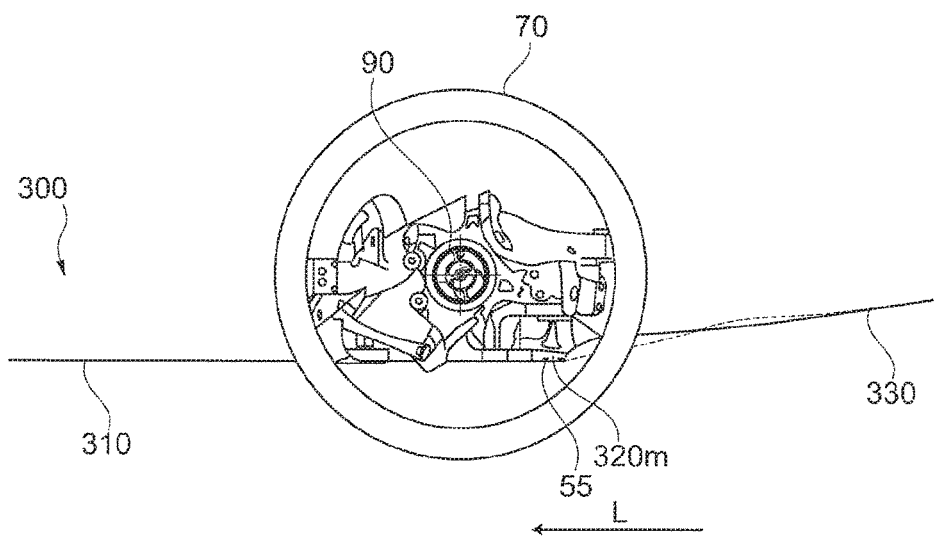

FIGS. 3a to 3c show an alternative exemplary embodiment of an underbody cladding 300 according to the invention, wherein the underbody cladding 300 likewise has a front section 310, a central section 320 and a rear section 330. The underbody cladding 300 is also designed such that, in a functional state in which it is arranged on a motor vehicle, as illustrated in FIGS. 3a and 3b, the central section 320 is situated under the wheel-controlling links 95a and 95b.

However, in the case of this underbody cladding 300, the central section 320 is in turn divided into three subsections 320v, 320m and 320h, specifically a front subsection 320v, a central subsection 320m and a rear subsection 320h. The central subsection 320m is, in a functional state in which the underbody cladding is arranged on a motor vehicle, situated under the spring link 95a.

The underbody cladding 300 also differs from the underbody claddings 100 and 200 described above in that it extends only partially in a substantially horizontal plane, see FIG. 3c, with in particular only the front section 310 and the front subsection 320v extending in the plane. In this exemplary embodiment, the remaining part of the underbody cladding 300 extends, by contrast, obliquely rearward and upward, giving rise to a diffuser action. In this way, the downforce on the rear axle can be increased in a simple manner. In some cases, it may however also be advantageous, in particular with regard to the drag coefficient ($c_x$), for the underbody cladding to extend entirely in a horizontal plane, in the same way as, for example, the above-described underbody claddings 100 and 200 illustrated in FIGS. 1a to 1e and 2a.

Furthermore, by contrast to the underbody claddings 100 and 200 described above, the underbody cladding 300 is also not a unipartite sheetlike structure, but is of multi-part form. That is to say, the underbody cladding 300 is assembled from multiple units. In this case, the front section 310 is formed in one piece with the front subsection 320v, and the rear section 330 is formed in one piece with the rear subsection 320h. The central subsection 320m forms a separate unit. That is to say, the underbody cladding 300 is assembled from three units or individual parts, in particular three sheetlike structures.

The front section 310 and the front subsection 320v and the rear section 330 and the rear subsection 320h are in this case composed of a flexible but not elastic material, that is to say a material which is not elastically deformable in all directions, whereas the central subsection 320m is composed of an elastic material, that is to say preferably from a material which exhibits yielding properties in all force directions, in particular a resiliently elastic material, for example from an elastic foil or the like. The flexibility or yieldingness of the central section 320 is in this case realized in particular by way of the elastic material of the central subsection 320.

Figure 3D:
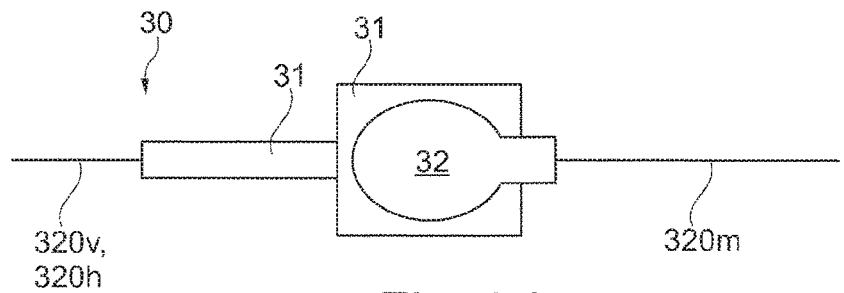
FIG. 3d is a diagrammatic illustration of a welt connection, by way of which individual parts of the underbody cladding can be connected to one another.

For the most advantageous possible aerodynamics, the front subsection 320v and the rear subsection 320h are, as in this exemplary embodiment, connected in each case by way of a welt connection 30 to the elastic central subsection 320m. FIG. 3d schematically illustrates the principle of the welt connection 30. The welt connection 30 has a welt 32 and a welt rail 31 which serves as a guide groove for the welt 32. The welt 32 is an edge thickening of the central subsection 320m, that is to say a thickening of an edge of the elastic subsection 320m. Here, the welt 32 is fixedly connected to the central subsection 320m, in particular by way of a welt lug (not illustrated in any more detail here) which encases or engages around the welt 32 in U-shaped fashion and the two ends of which are fastened in each case to the elastic subsection 320m. Here, the welt 32 is guided in the oval-shaped welt rail 31, or is inserted into the welt rail 31, such that a positively locking connection between the welt rail 31 and welt 32 is realized perpendicular to the welt rail axis which extends perpendicular to the plane of the drawing, such that the central subsection 320m can, by way of fastening means situated on the welt rail 31 for the purposes of fastening the welt rail 31, be a really tensioned substantially transversely with respect to the welt rail 31.

In this exemplary embodiment, the welt connection 30 extends over the entire width of the underbody cladding 300, specifically not directly in the vehicle transverse direction but in arcuate fashion, in particular in a manner substantially corresponding to a contour of the spring link 95a. By way of the welt connections 30, the central subsection 320m can in particular be tensioned in the vehicle longitudinal direction L such that a tendency of the underbody cladding 300 to flutter can be considerably reduced.

Figure 3E:
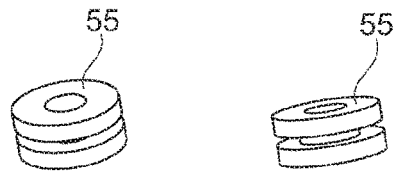
FIG. 3e illustrates, on their own, inlays by way of which the underbody cladding from FIGS. 3a to 3c can be partially fastened to the motor vehicle.

For a further reduction of the tendency of the underbody cladding 300 to flutter, it is furthermore the case that multiple inlays 55 for the attachment, in particular screw connection, of the central subsection 320m to the spring link 95a are inserted into the central subsection 320m. These inlays are illustrated on their own in FIG. 3e in order to give a better understanding thereof.

In order for the front section 310 and the rear section 330 to be fastened in positionally static fashion to the vehicle and for the central section 320 to nevertheless, by way of its three subsections 320v, 320m and 320h, follow or yield to the movement of the wheel-controlling links 95a. 95b, in each case one film hinge 325a and 325b is provided between the front section 310 and the front subsection 320v and between the rear subsection 320h and the rear section 330, respectively. Here, the film hinges 325a and 325b preferably permit a type of compensation movement, in particular a follow-up movement of the front subsection 320v and of the rear subsection 320h respectively with respect to the central subsection 320m, for example if, as a result of a vertical movement of the wheel-controlling links 95a, 95b, the central subsection is displaced, or deflects or yields, in a downward direction.

Here, the hinge axes of the film hinges 325a and 325b are arranged such that the elongated hinge axes intersect at the intersection point $S_1$, which lies in the substantially horizontal plane of the front section 310 of the underbody cladding 300 in an elongation of a longitudinal axis, projected perpendicularly downward into said plane, of the spring link 95a, see FIG. 3b. Here, the intersection point $S_1$ preferably lies further toward the inside, that is to say further toward a center of the vehicle, than the effective kinematic point of the attachment of said link 95a to the vehicle body, wherein here, the intersection point $S_1$ lies further toward the inside the broader the central section 320 is in the region of an inner edge of the underbody cladding 300. Furthermore, the connecting axis of the film hinge 325a, that is to say the axis along which the central section 320 is connected to the front section 310, extends through a kinematic point $S_2$, projected vertically downward into the substantially horizontal plane, of the longitudinal link 95b. By way of such a corresponding arrangement of the hinge axes, in particular by way of the arrangement described above, it is possible for a collision with the wheel-controlling links 95a, 95b to be prevented.

Figure 4A:
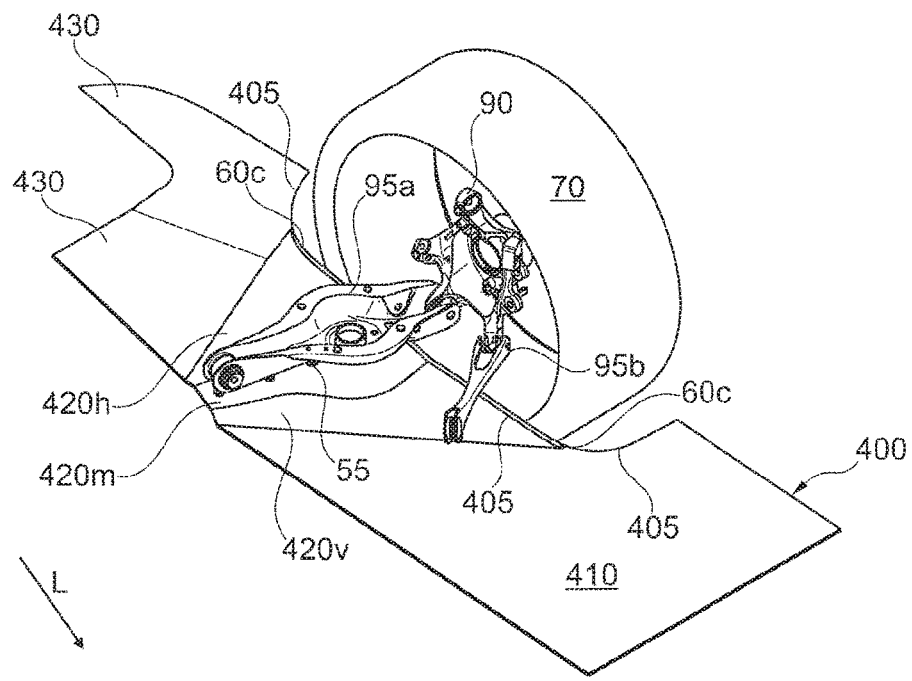
FIG. 4a shows a fourth exemplary embodiment of an underbody cladding according to the invention in a functional state, in which it is arranged on a two-track motor vehicle, in a view obliquely from above.

FIG. 4a shows a fourth exemplary embodiment of underbody cladding 400 according to the invention, wherein the fourth exemplary embodiment is a refinement of the underbody cladding 300 illustrated in FIGS. 3a to 3e and likewise has a front section 410, a central section 420 and a rear section 430. The central section 420 is likewise divided into a front subsection 420v, a central subsection 420m and a rear subsection 420h.

In the case of the underbody cladding 400, the front subsection 420v and the central subsection 420m are in each case additionally fastened by way of a Cardan bearing 50 to the wheel-controlling links 95a and 95b arranged thereabove. In this way, the fluttering of the underbody cladding 400 can be yet further reduced, and the tendency to flutter can be further greatly improved. Furthermore, as can be clearly seen in FIG. 4a, the exemplary embodiment has, on the outer edge 405 facing toward the rear wheel 70, a flow lip 60c which extends substantially in the vehicle longitudinal direction L over the entire length of the central section 420 and protrudes vertically upward. By way of said flow lip 60c, it is possible to substantially prevent air flow from passing from an underside of the underbody cladding 400 to a top side of the underbody cladding, which can have a disadvantageous effect on the aerodynamics.

Figure 5A:
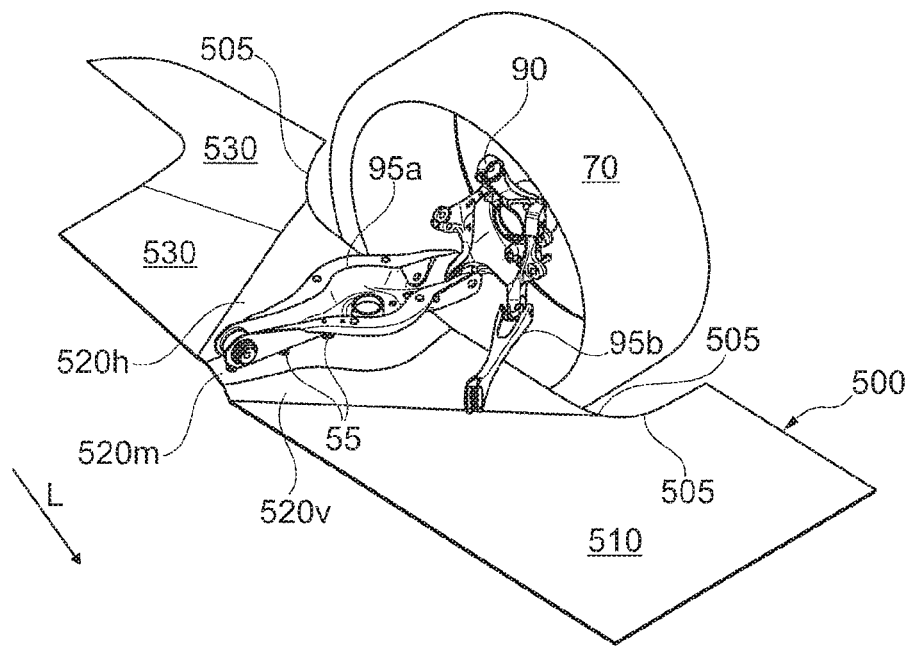
FIGS. 5a and 5b show a fifth exemplary embodiment of an underbody cladding according to the invention in a functionally arranged state in a view obliquely from above and in a side view from the outside of the vehicle, respectively.
Figure 5B:
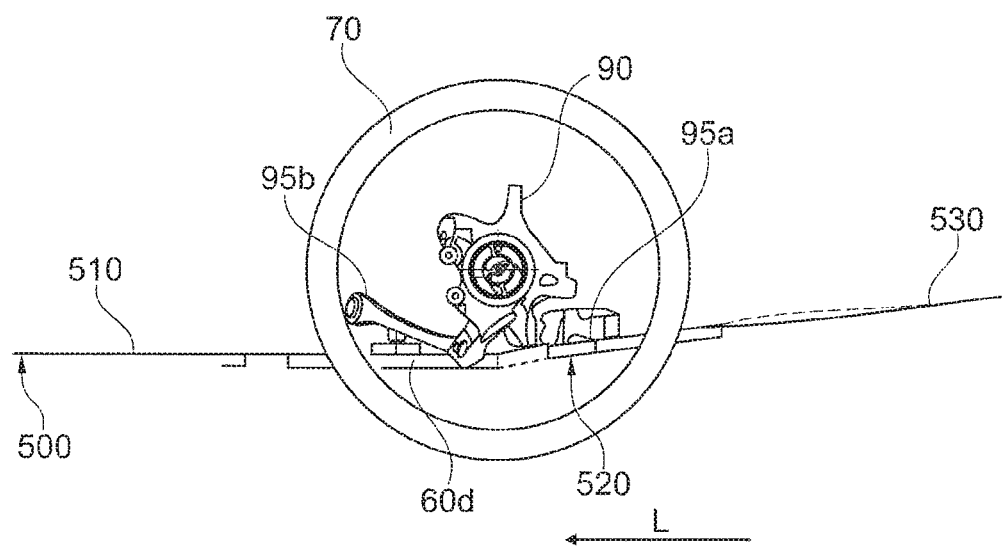

FIGS. 5a and 5b show an underbody cladding 500 according to the invention which is an alternative embodiment to the underbody cladding 400 illustrated in FIGS. 4a and 4b and which likewise has a front section 510, a central section 520 and a rear section 530. The central section 520 is likewise divided into a front subsection 520v, a central subsection 520m and a rear subsection 520h.

Instead of a vertically upwardly extending flow lip 60c, the underbody cladding 500 has a substantially vertically downwardly directed flow lip 60d, see in particular FIG. 5b, which in this case however also extends substantially in the vehicle longitudinal direction L along the outer edge 505 on the inner side of the rear wheel 70 in the central section 520. By way of such a flow lip 60d, it is possible in particular to prevent air flow which passes around the vehicle during driving operation from flowing from the underbody cladding 500 into the wheel arch.

Figure 6A:
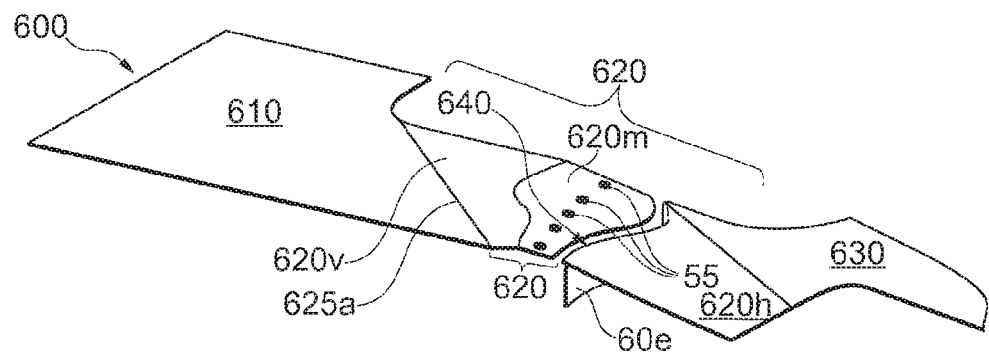
FIG. 6a illustrates the sixth exemplary embodiment on its own in a perspective view.
Figure 6B:
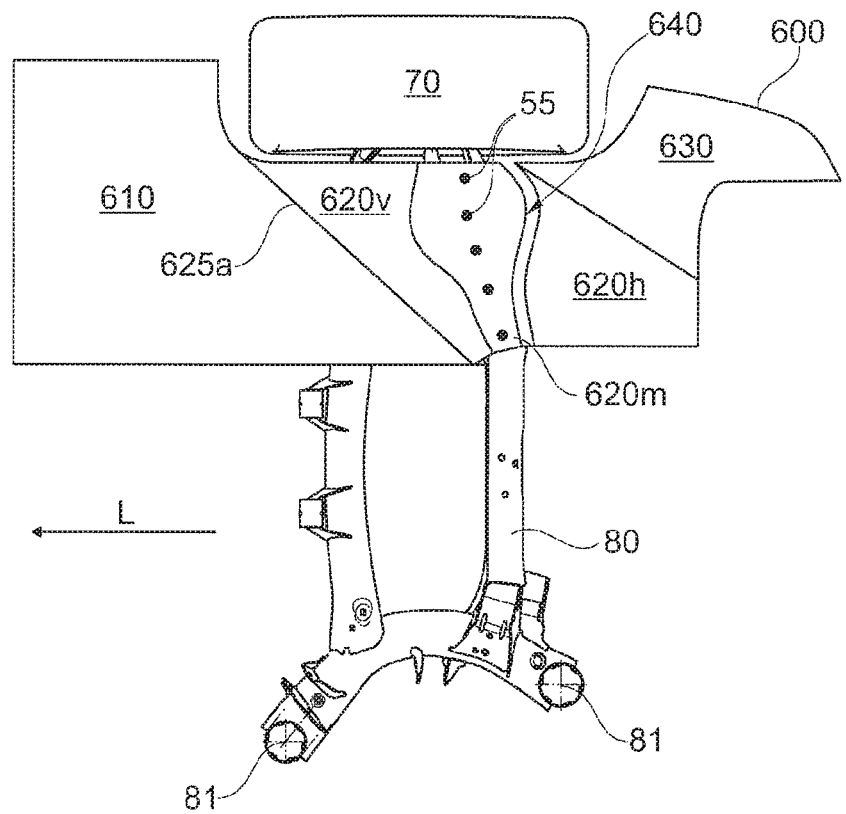
FIGS. 6b and 6c illustrate the underbody cladding from FIG. 6a in a functionally arranged state in a view from below and obliquely from above, respectively.
Figure 6C:
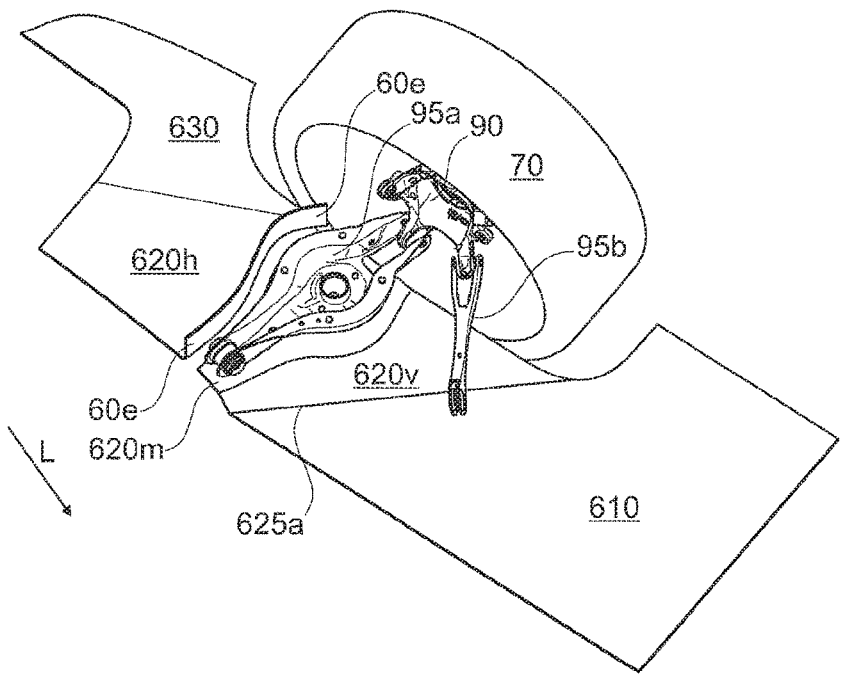

FIGS. 6a to 6c show a sixth exemplary embodiment of an underbody cladding 600 according to the invention, which likewise has three sections 610, 620 and 630. The central section 620 is in turn also divided into three subsections 620v, 620m and 620h, but the central subsection 620m is not connected in each case to the front subsection 620v and to the rear subsection 620h by way of a welt connection 30, as is the case in the third, fourth and fifth exemplary embodiments, that is to say in the case of the underbody claddings 300, 400 and 500 according to the invention. Rather, the central subsection 620m and the rear subsection 620h are separated from one another merely by way of a narrow gap 640 with a gap width of 5 mm. The gap width may however also be less than 5 mm, preferably 3 mm, or greater than 5 mm, in particular 5 to 10 mm. The gap width is preferably as small as possible, wherein the gap width is however at least large enough that adequate free mobility is realized for a movement of the central subsection 620m, wherein the required free mobility and thus a required minimum gap width is dependent on the kinematics and the elastokinematics of the axle.

By virtue of the fact that the central subsection 620m is not connected to the rear subsection 620h, a welt connection can be omitted. Furthermore, the rear section 620h does not need to perform a compensation movement and partially follow the movement of the central section 620m, such that a film hinge is no longer required between the rear subsection 620h and the rear section 630 of the underbody cladding 600.

As a result, in particular by virtue of the fact that, in this embodiment, only one film hinge 625a and one welt connection 30 are required, and the rear welt connection and the rear film hinge between the rear subsection 620h and the rear section 630 can be omitted, this embodiment is much less expensive and less complex than the embodiments of an underbody cladding 300, 400 and 500 according to the invention as described above. In some cases, however, it is possible even with an underbody cladding 600 of said type to realize advantageous or sufficiently advantageous aerodynamics, in particular if, in addition, a flow lip 60e is provided adjacent to the gap 640. Here, it is particularly advantageous if the flow lip 60e is preferably arranged, as in this exemplary embodiment, at the edge of the rear subsection 620h and extends approximately vertically downward and over the entire width of the underbody cladding 600 in the region.

Figure 7:
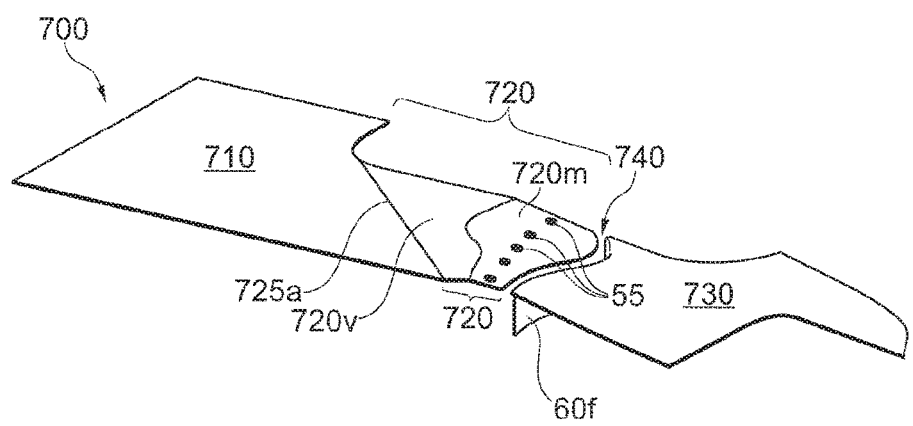
FIG. 7 illustrates a seventh exemplary embodiment of an underbody cladding according to the invention on its own in a perspective view.

It is also possible for the rear subsection 620h to be omitted entirely, or formed in one piece with the rear section 630, as is illustrated by way of example in FIG. 7. Here, FIG. 7 shows a seventh exemplary embodiment of an underbody cladding according to the invention illustrated on its own in a perspective view, wherein, in this exemplary embodiment, by contrast to the sixth exemplary embodiment illustrated in FIGS. 6a to 6c, the central section 720 is divided into only two subsections 720v and 720m, that is to say a front subsection 720v and a central subsection 720m, rather than three subsections.

With the described exemplary embodiments of an underbody cladding 100, 200, 300, 400, 500, 600 and 700 according to the invention, underbody claddings 100, 200, 300, 400, 500, 600 and 700 are provided which are each of large-area form and thus optimized in terms of air resistance and which permit a compensation movement in the region of the wheel-controlling links 95a, 95b without colliding therewith, and which exhibit virtually no tendency to flutter. In particular, with an underbody cladding 100, 200, 300, 400, 500, 600 or 700 according to the invention, it is possible to realize highly advantageous aerodynamics of the underbody and thus lower fuel consumption, and to reduce $CO_2$ emissions. An underbody cladding according to the invention may in this case also be designed so as to influence the downforce action, for example in such a way that the downforce is increased and the driving characteristics, in particular the driving dynamics, are positively influenced, and/or in such a way that the downforce is reduced, which commonly leads to a reduction of the drag coefficient ($c_x$).

LIST OF REFERENCE DESIGNATIONS

30 Welt connection
31 Welt rail
32 Welt
50 Cardan bearing
55 Inlay
60a, 60b 60c, 60d, 60e, 60f Flow lip
70 Rear wheel
80 Rear-axle support
81 Rear-axle support bearing
90 Wheel support
95 Wheel-controlling link 95*a* Spring link
95*b* Longitudinal link
100, 200, 300, 400, 500, 600, 700 Underbody cladding according to the invention
105, 405, 505 Outer edge
110, 210, 310, 410, 510, 610, 710 Front section
120, 220, 320 420, 520, 620, 720 Central section
130, 230, 330, 430, 530, 630, 730 Rear section
140, 240 Slots
250 Film hinge between slot ends
325*a*, 625*a*, 725*a* Connection between the front section and the central section
325*b* Connection between the central section and the rear section
320*v*, 420*v*, 520*v*, 620*v*, 720*v* Front subsection of the central section
320*m*, 420*m*, 520*m*, 620*m*, 720*m* Central subsection of the central section
320*h*, 420*h*, 520*h*, 620*h* Rear subsection of the central section
640, 740 Gap
L Vehicle longitudinal direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component for a two-track motor vehicle having wheel-controlling links as part of a rear axle, comprising:
    an underbody cladding for cladding an underbody at least on one vehicle side in a region of the wheel-controlling links of the rear axle such that, when in an installed state on the two-track motor vehicle, the underbody cladding extends under the wheel-controlling links at least partially in a substantially horizontal plane and, at least in a direction of an outer side of the vehicle, extends close to an inner side of a rear wheel of the motor vehicle, the rear wheel being connected via a wheel support to the wheel-controlling links, wherein
    the underbody cladding is divided in a vehicle longitudinal direction into three sections comprising a front section, a central section and a rear section,
    the central section extends under the wheel-controlling links on one vehicle side, and is connected at least over a part of a width of the central section to one or both of the front section and the rear section,
    the central section is configured such that, in the installed state installed on the motor vehicle, the central section at least partially follows and/or at least partially yields to a substantial vertical movement of the wheel-controlling links during driving operation of the motor vehicle,
    the front section and the rear section of the underbody cladding are configured to be arranged positionally statically on the motor vehicle such that, when in the installed state, the front and rear sections do not follow and/or yield to the substantial vertical movement of the wheel-controlling links.

2. The component according to claim 1, wherein the underbody cladding has a unipartite form.

3. The component according to claim 2, wherein
    the underbody cladding is divided, via at least two slots, such that the central section at least partially follows and/or yields to the vertical movement of the wheel-controlling links, and
    the at least two slots extend toward the inside of the vehicle from an outer edge of the underbody cladding, the outer edge facing toward the inner side of the rear wheel in the functionally installed state.

4. The component according to claim 1, wherein
    the underbody cladding is divided, via at least two slots, such that the central section at least partially follows and/or yields to the vertical movement of the wheel-controlling links, and
    the at least two slots extend toward the inside of the vehicle from an outer edge of the underbody cladding, the outer edge facing toward the inner side of the rear wheel in the functionally installed state.

5. The component according to claim 4, wherein
    a film hinge connects the two slots to one another between ends nearest the inside of the motor vehicle.

6. The component according to claim 5, wherein the film hinge extends substantially in the vehicle longitudinal direction in the functionally installed state.

7. The component according to claim 1, wherein
    the underbody cladding has a multi-part form, and
    the central section is connected via a film hinge to the front section and/or the rear section over at least a part of the width of the underbody cladding.

8. The component according to claim 7, wherein
    the front section and the rear section are composed of a flexible material, and
    the central section at least partially has a region composed of an elastic material.

9. The component according to claim 7, wherein
    the central section is divided in the vehicle longitudinal direction into a front subsection and a central subsection,
    the central subsection extends, at least over one region, under one of the wheel-controlling links, and
    the central section is connected at least over a part of its width to the front subsection.

10. The component according to claim 9, wherein the central subsection extends under a spring link of the wheel-controlling links.

11. The component according to claim 9, wherein the central subsection is composed of an elastic material and is connected to the front subsection via a welt connection.

12. The component according to claim 1, wherein
    the central section is fastened at least regionally to one of the wheel-controlling links.

13. The component according to claim 12, wherein a Cardan bearing provides the fastening of the central section to the one or the wheel-controlling links.

14. The component according to claim 1, wherein the underbody cladding comprises at least one flow lip.

15. The component according to claim 1, wherein the underbody cladding is configured for a passenger motor vehicle.

16. A two-track motor vehicle, comprising:
    wheel-controlling links of a rear axle;
    a rear wheel of the motor vehicle, the rear wheel being connected via a wheel support to the wheel-controlling links;
    an underbody cladding for cladding an underbody at least on one vehicle side in a region of the wheel-controlling links of the rear axle such that the underbody cladding extends under the wheel-controlling links at least partially in a substantially horizontal plane and, at least in a direction of an outer side of the vehicle, extends close to an inner side of the rear wheel, wherein the underbody cladding is divided in a vehicle longitudinal direction into three sections comprising a front section, a central section and a rear section, the central section extends under the wheel-controlling links on one vehicle side, and is connected at least over a part of a width of the central section to one or both of the front section and to the rear section, the central section is configured such that the central section at least partially follows and/or at least partially yields to a substantial vertical movement of the wheel-controlling links during driving operation of the motor vehicle, and the front section and the rear section of the underbody cladding are attached positionally statically on the motor vehicle so as not to follow and/or yield to the substantial vertical movement of the wheel-controlling links.

\* \* \* \* \*